Figure 1:
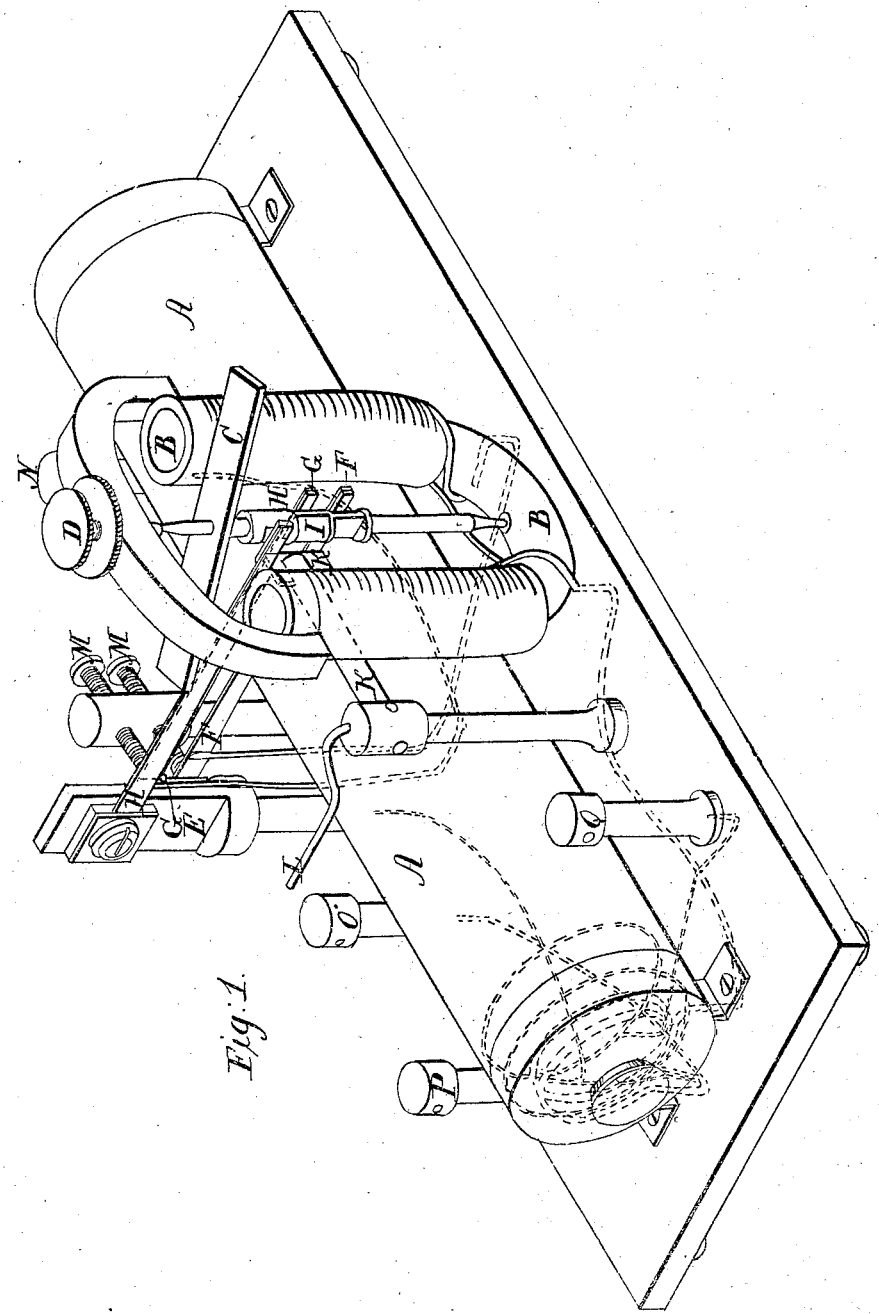

S. B. Smith.
Induction Coil.

N° 7,420.   Patented Jun. 4, 1850.

UNITED STATES PATENT OFFICE.

SAMUEL B. SMITH, OF NEW YORK, N. Y.

IMPROVEMENT IN ELECTRO-MAGNETIC MACHINES FOR SHOCKS.

Specification forming part of Letters Patent No. 7,420, dated June 4, 1850.

*To all whom it may concern:*

Be it known that I, SAMUEL B. SMITH, of the city of New York, in the county and State of New York, have invented a new and useful Machine for Medical Purposes, for Electro-Magnetic Plating, and for other Chemical Purposes. The machine is an electro-magnetic machine. To distinguish it from the ordinary electro-magnetic machines, and to designate its action I call it the "Automaton Direct and To-and-fro Current Electro-Magnetic Machine;" and I do hereby declare that the following is a full, clear, and exact description of the construction and operation of the same, reference being had to the annexed drawings, making a part of this specification, of which—

Figure 1 is a perspective view.

Letter A is the helix or coil of fine and coarser wire of copper; B B, the electro-magnet; C, the armature, which revolves with its vertical axis on two jewels; D, a screw for adjusting the armature; E, a brass post, to which the springs are screwed; F, a spring, which is in electric communication with one end of the fine and of the coarser wires of the helix—in connection with the coarse wire after having formed the helix and been coiled around the electro-magnet, and thus conveying the primary current to the break-piece on the axle of the armature; G, a spring, which is in communication, through the post E, with the other end of the fine wire. Near the ends of the three springs F, G, and H is soldered onto the springs a small strip of silver, which alternately strikes the break-piece as it revolves. H, a spring, which is in contact with the coarse wire which leads direct to the battery; I, the break-piece; K, a stay, at one end of which is fixed a strip of gutta-percha, to keep the springs F and G from approaching too near the break-piece; L, a movable wire, to be used when required to press the spring G off from the break-piece; M M, two screws, insulated at one end of them, to press against the springs F and G to regulate their pressure against the break-piece; N, a brass post, into a hole near the upper end of which is placed a conducting-wire from the zinc of the battery; O, another brass post, for receiving a conducting-wire from the copper of the battery; P, a brass post for receiving the conducting-wire of the secondary current; Q, another brass post for receiving the conducting-wire of the secondary current—the one negative, the other positive.

Explanation of the manner in which the machine operates and further explanations relative to particular parts: Any of the ordinary galvanic batteries will answer for this machine. The connections for the passage of the electricity are made as follows: A connecting-wire leads from the copper of the battery to the post O. From this post it passes on, at the bottom of the stand on which the helix is placed, to the helix. Having formed two layers of the coil of the helix, it passes on to the magnet B, around which it makes two layers. It then passes on over the bottom of the stand and terminates on the spring F. Another connecting-wire leads from the zinc of the battery to the post N. It then passes over the bottom of the stand and terminates on the spring H. In this way the entire galvanic circuit of the primary current is formed. The fine wire, (of which there are from twelve to sixteen layers wound over the two layers of the coarse wire,) after passing around and forming the helix, runs as follows: One end of it is soldered onto the coarse wire of the primary coil on the bottom of the stand. It is soldered onto the part that leads to the magnet B. The other end of the fine wire passes through, also, to the bottom of the stand, and it is soldered to the post P. It then passes on, terminates at, and is soldered onto the bottom of the post E. From this juncture, the post being brass, there is a metallic communication to the spring G, but no such communication to the springs F and H, which are insulated from it by gutta-percha washers. There is a washer of gutta-percha between each of these two springs and the post, and between the springs and the heads of the screws which hold the springs to the post, the holes in the springs through which the screws pass being sufficiently large to prevent a contact between the screws and the springs. When the machine is in operation, and at the moment when the break-piece I strikes the silver strip on the spring F, there is no communication between the break-piece and silver strip on the spring G, but there is a communication between the silver strip on spring H and the break-piece. Consequently at this juncture the circuit of the primary current is closed. At this instant of contact between the positive and negative electric states the shock is transmitted and felt at the terminations of the fine wire, or at any points in metallic communication with those terminations. In other words, it is felt at the posts P and Q, which are in communication with the terminations of the fine wire. As the armature revolves the break-piece ceases to be in contact with the silver strip on spring F. Just previous to this break of contact the break-piece comes into contact with the silver strip on spring G, the contact on silver strip on spring H still continuing. Under these circumstances when the contact at spring F is broken the shock is not transmitted nor felt at either of the posts P or Q, because the electric current of the secondary or fine wire passes through the battery. The armature still revolving, the break-piece again strikes the silver strip at spring F, and the same results follow as have been described. In this manner no electric current is transmitted to the posts P and Q, but the direct current, the back current, or the to-and-fro current of the ordinary electro-magnetic machines being thus wholly avoided.

The following experiments demonstrate the accuracy of the above statements: Pour into a glass tumbler a metallic solution—the sulphate of copper, for instance. (Care should be taken that the solution be made of rain-water.) Introduce into this solution a piece of platina plate soldered onto the end of a metallic conductor leading to post P. In like manner introduce another piece of wire into the solution with a piece of platina soldered to the end of it, and connect this with the post Q. Let the two pieces of platina be a short distance apart in the solution. Put the machine into operation, and immediately the process of electroplating commences, and in a few minutes the platina on the negative conductor will be found to be well coated with copper, while none of the copper will be on the platina at the end of the positive conductor. Reverse the poles—that is, place the coarse connecting-wire that was in connection with the copper of the battery into connection with the zinc, and that which was in connection with the zinc into connection with the copper—and the copper precipitate which was deposited on the former negative conductor will be driven from it, and the platine on the end of the other wire, which is now made negative, will be found to receive a metallic coating. The deposition of metals on the negative conductor of the voltaic battery is a well-known fact. No such effect ever takes place on the positive conductor, from whence the electric current flows.

We will now try another experiment illustrative of the effect of the to-and-fro direction of the electric current in the ordinary electro-magnetic machines.

In the annexed drawing, L is a brass wire, movable on a journal at the top of the post which supports it. By moving this wire around till the end of it presses against the spring G said spring is borne off till the silver strip on it is no longer in contact with the break-piece. Under this circumstance this machine is made to act on the to-and-fro principle, the same as the ordinary electro-magnetic machines. It acts now on this principle, because the electric current of the secondary or fine wire does not now pass through the battery, but passes to and fro in a direction in which the posts Q and P are in the circuit. With the machine in this situation we will again introduce the two wires into the tumbler in the same manner as in the former experiment. The machine is now put into operation, but instead of finding the platina on the negative conductor to become coated with copper, we find no such coating—no more than at the positive conductor. We may continue the operation any length of time and no metallic deposit takes place. Again, let us remove this wire L from the spring, and the metallic coating immediately commences on the negative conductor, as in the experiment at first.

There is a great advantage in the above-described machine, in that the direct current can be used, when it is requisite, without the to-and-fro current.

As a therapeutic agent, there are many diseases in which the to-and-fro current is indicated and is beneficial. There are other diseases in which it is injurious. The to-and-fro current is useful when an alterative and stimulant are wanting. In such cases it is a valuable medical agent.

What I claim, therefore, as my invention, and desire to secure by Letters Patent, is—

1. Separating the shock derived from the initial secondary current of the double-coil magneto-electric machine from that of the terminal secondary by causing the latter to pass through a closed circuit, substantially in the manner and for the purposes set forth.

2. The manner of adapting the same machine to transmit both the initial and terminal secondary currents at pleasure by bearing off the spring G by the arm L, substantially as described.

SAM. B. SMITH.

Witnesses:
JOHN B. GARDNER,
N. H. GALE.